(12) United States Patent
Arumugham et al.

(10) Patent No.: US 7,814,301 B2
(45) Date of Patent: Oct. 12, 2010

(54) CLOCK ARCHITECTURE FOR MULTI-PROCESSOR SYSTEMS

(75) Inventors: Rangaswamy Arumugham, Richardson, TX (US); Mark Shaw, Richardson, TX (US); Russ W. Herrell, Ft. Collins, CO (US); Lisa Pallotti, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 11/786,125

(22) Filed: Apr. 11, 2007

(65) Prior Publication Data

US 2008/0256379 A1 Oct. 16, 2008

(51) Int. Cl.
*G06F 9/00* (2006.01)
(52) U.S. Cl. ..................... 712/220; 713/400
(58) Field of Classification Search ................. 713/400; 712/220
See application file for complete search history.

(56) References Cited

U.S. PATENT DOCUMENTS

| | | | |
|---|---|---|---|
| 5,448,716 A * | 9/1995 | Hardell et al. ............... 713/375 |
| 5,502,819 A * | 3/1996 | Aldrich et al. ............... 713/375 |
| 5,648,959 A * | 7/1997 | Ilyadis et al. ............... 370/445 |
| 5,689,689 A * | 11/1997 | Meyers et al. ............... 713/375 |
| 5,958,033 A | 9/1999 | Schubert et al. |
| 6,335,725 B1 | 1/2002 | Koh et al. |
| 6,665,316 B1 * | 12/2003 | Eidson ....................... 370/509 |
| 6,681,282 B1 | 1/2004 | Golden et al. |
| 6,711,693 B1 | 3/2004 | Golden et al. |
| 6,816,809 B2 | 11/2004 | Circenis |
| 6,838,904 B1 * | 1/2005 | Agrawal et al. ............... 326/41 |
| 6,864,710 B1 * | 3/2005 | Lacey et al. .................. 326/39 |
| 6,871,264 B2 | 3/2005 | Soltis, Jr. |
| 6,973,517 B1 | 12/2005 | Golden et al. |
| 7,024,510 B2 | 4/2006 | Olarig |
| 7,028,302 B2 | 4/2006 | Kiick |
| 7,072,825 B2 * | 7/2006 | Wang et al. .................. 703/28 |
| 7,089,413 B2 | 8/2006 | Erickson et al. |
| 7,146,496 B2 | 12/2006 | Circenis et al. |
| 7,178,015 B2 | 2/2007 | Shaw et al. |
| 7,228,451 B1 * | 6/2007 | Nguyen et al. ............... 713/500 |
| 7,276,943 B2 * | 10/2007 | Starr et al. ................... 327/147 |
| 7,317,342 B2 * | 1/2008 | Saint-Laurent .............. 327/295 |
| 7,447,931 B1 * | 11/2008 | Rischar et al. .............. 713/400 |
| 7,599,299 B2 * | 10/2009 | Goetting et al. ............. 370/241 |
| 2004/0177242 A1 * | 9/2004 | Erickson et al. ................ 713/2 |
| 2005/0134332 A1 * | 6/2005 | Wang et al. ................. 327/108 |
| 2005/0154869 A1 * | 7/2005 | Shaw et al. .................... 713/1 |
| 2005/0160249 A1 | 7/2005 | Sankruthi |
| 2006/0075309 A1 | 4/2006 | Mayo et al. |
| 2008/0080566 A1 * | 4/2008 | Arumugham et al. ........ 370/503 |

* cited by examiner

*Primary Examiner*—Eddie P Chan
*Assistant Examiner*—Idriss N Alrobaye

(57) ABSTRACT

In one embodiment, a computer system, comprises at least a first computing cell and a second computing cell, each computing cell comprising at least one processor, a routing device to couple the first and second computing cells, a global clock signal source coupled to the at least two computing cells to generate a global clock signal, at least one timing manager to generate a timing control signal, wherein the at least two computing cells comprise a local oscillator to generate a local clock signal, and a multiplexer coupled to receive the global clock signal, the local clock signal, and the timing control signal, and to output one of the global clock signal or the local clock signal in response to the control signal.

17 Claims, 6 Drawing Sheets

CLOCK ARCHITECTURE FOR MULTI-PROCESSOR SYSTEMS

BACKGROUND

This application relates to electronic computing and more particularly to a clock architecture for multi-processor systems.

High performance computer systems may utilize multiple processors to increase processing power. Processing workloads may be divided and distributed among the processors, thereby reducing execution time and increasing performance. One architectural model for high performance multiple processor system is the cache coherent Non-Uniform Memory Access (ccNUMA) model. Under the ccNUMA model, system resources such as processors and random access memory may be segmented into groups referred to as Locality Domains, also referred to as "nodes" or "cells". Each node may comprise one or more processors and physical memory. A processor in a node may access the memory in its node, referred to as local memory, as well as memory in other nodes, referred to as remote memory.

Multi-processor computer systems may be partitioned into a number of elements, or cells. Each cell includes at least one, and more commonly a plurality, of processors. The various cells in a partitioned computer system may run different operating systems, if desired.

Some multi-processor computer systems rely on a centralized, global system clock to supply clock signals to the various cells. In a centralized, global clock architecture a failure in the global clock can cause a catastrophic failure in the entire computer system.

DETAILED DESCRIPTION

Described herein are exemplary clock architectures in multi-processor systems. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1B:
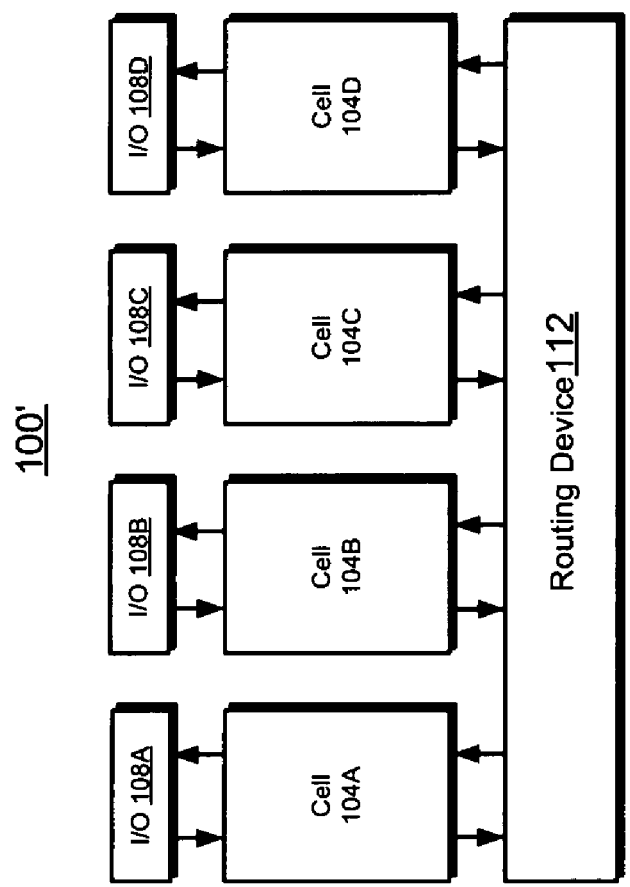
FIGS. 1A, 1B and 1C are schematic illustrations of one embodiment of a multiprocessor computer system according to embodiments.
Figure 1A:
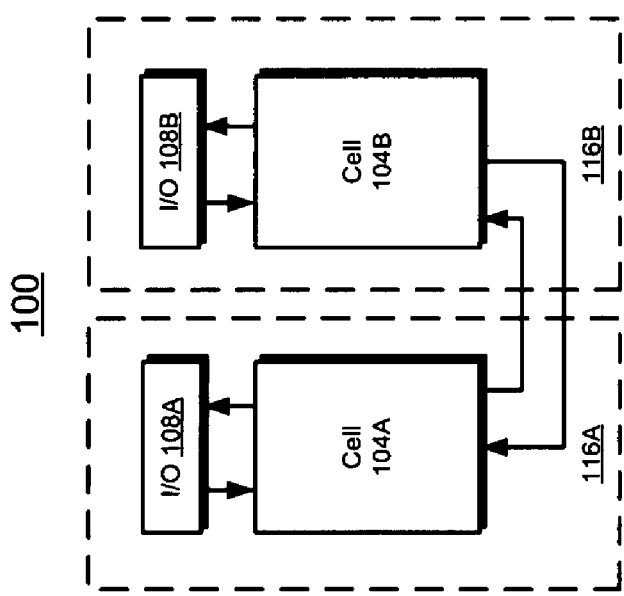
Figure 1C:
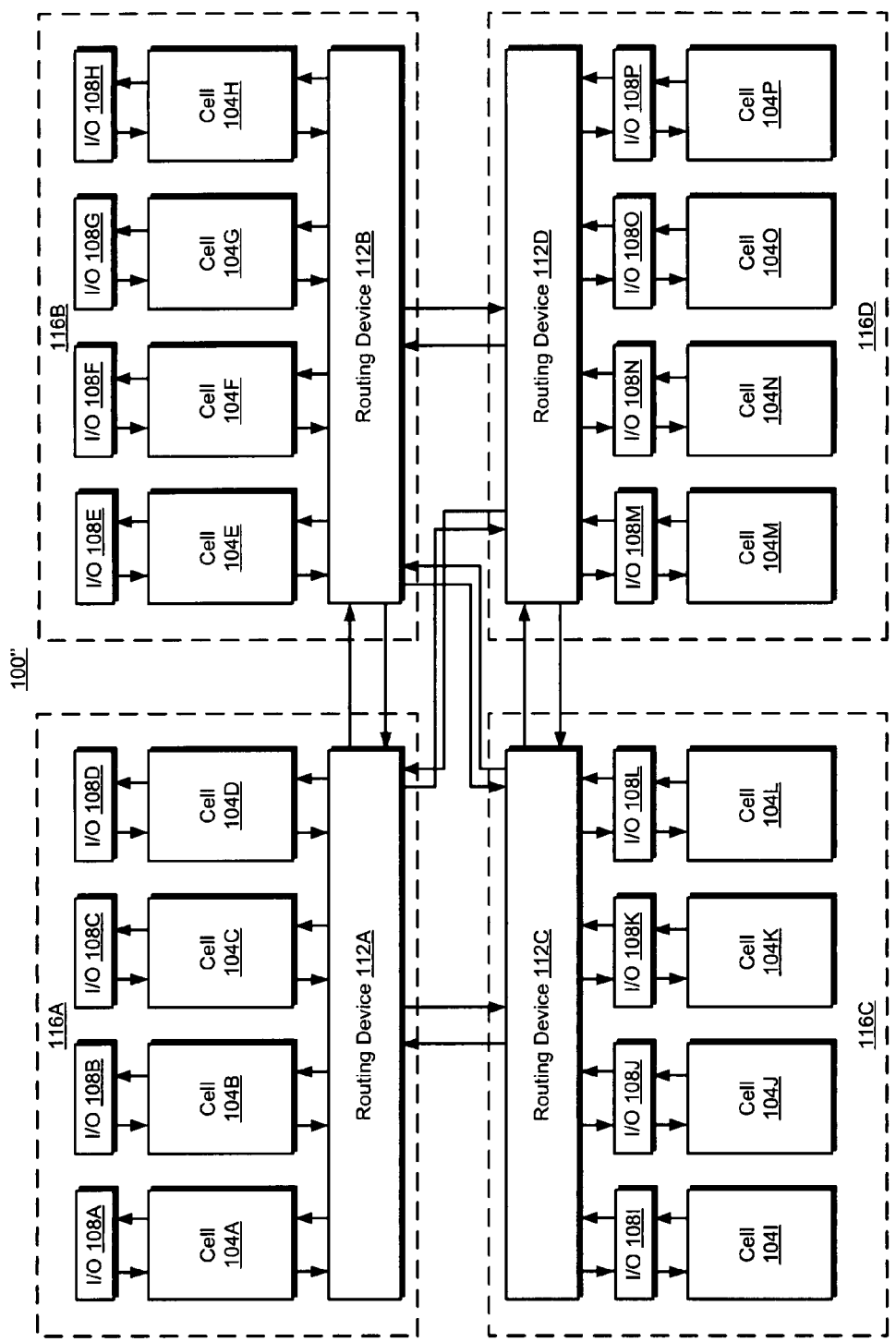

With reference to FIGS. 1A, 1B, and 1C, a partitionable computer system 100 can include a number of elements or cells 104. In FIG. 1A, only two cells 104A and 104B are present. However, more than two cells 104 can create the partitionable computer system 100. For example, FIG. 1B depicts a partitionable computer system 100' having four cells 104A, 104B, 104C, and 104D. In FIG. 1C, sixteen cells 104A, 104B, 104C, 104D, 104E, . . . 104P, create the partitionable computer system 100". Each cell 104 can communicate with a respective input and output module 108, which is used to provide input to the system 100 and output from the system 100.

In partitionable computer systems having more than two cells 104, for example systems 100' and 100" shown in FIGS. 1B and 1C, respectively, the cells 104 can communicate with each other through a routing device 112. The routing device can be a crossbar switch or other similar device that can route data packets. For example, a NUMAflex 8-Port Router Interconnect Module sold by SGI of Mountain View, Calif. can be used. The routing device 112 facilitates the transfer of packets from a source address to a destination address. For example, if cell 104A sends a packet to cell 104D, cell 104A sends the packet to the routing device 112, the routing device 112 in turn, transmits the packet to cell 104D.

In a larger partitionable computer system, such as the system 100" shown in FIG. 1C, there can be more than one routing device 112. For example, there can be four routing devices 112A, 112B, 112C, and 112D. The routing devices 112 collectively can be referred to as the switch fabric. The routing devices 112 can communicate with each other and a number of cells 104. For example, cell 104A, cell 104B, cell 104C and cell 104D can communicate directly with routing device 112A. Cell 104E, cell 104F, cell 104G, and cell 104H can communicate directly with routing device 112B. Cell 104I, cell 104J, cell 104K, and cell 104L can communicate directly with routing device 112C. Cell 104M, cell 104N, cell 104O, and cell 104P can communicate directly with routing device 112D. In such a configuration, each routing device 112 and the cells 104 that the routing device 112 directly communicates with can be considered a partition 116. As shown, in FIG. 1C there are four partitions 116A, 116B, 116C and 116D. As shown, each partition includes four cells, however; any number of cells and combination of cells can be used to create a partition. For example, partitions 116A and 116B can be combined to form one partition having eight cells. In one embodiment, each cell 104 is a partition 116. As shown in FIG. 1A, cell 104 can be a partition 116A and cell 104B can be a partition 116B. Although the embodiment depicted in FIG. 1C has four cells, other embodiment may have more or fewer cells.

Each partition can be dedicated to perform a specific computing function. For example, partition 116A can be dedicated to providing web pages by functioning as a web server farm and partition 116B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 2:
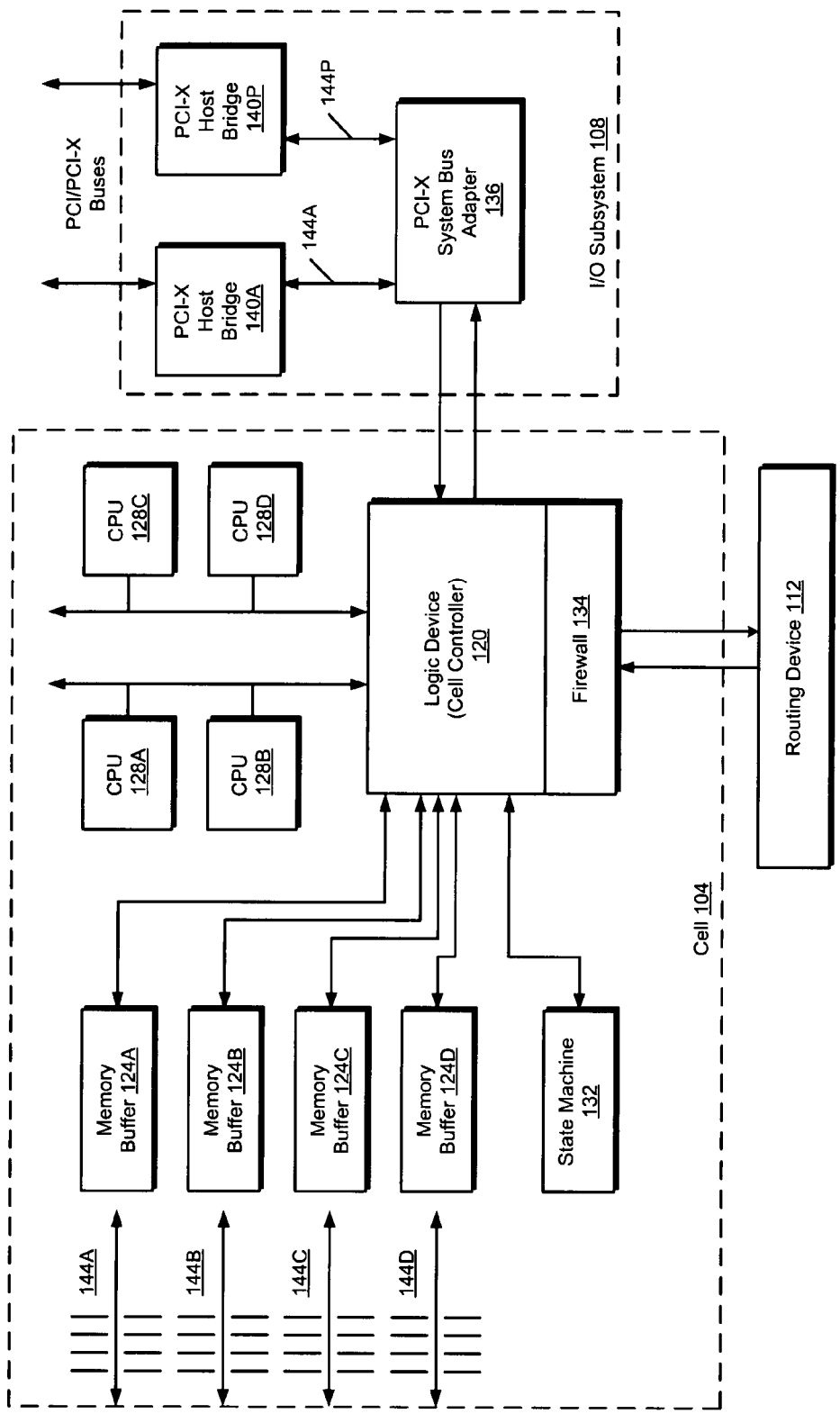
FIG. 2 is a block diagram of a cell, such as the cell depicted in FIG. 1B, according to some embodiments.

With reference to FIG. 2, each cell 104 includes a logic device 120, a plurality of memory buffers 124A, 124B, 124C, 124D (referred to generally as memory buffers 124), a plurality of central processing units (CPUs) 128A, 128B, 128C, 128D (referred to generally as CPUs 128), a state machine 132, and a firewall 134. The term CPU is not intended to be limited to a microprocessor, instead it is intended to be used to refer to any device that is capable of processing. The memory buffers 124, CPUs 128, and state machine 132 each communicate with the logic device 120. When the cell 104 is in communication with a crossbar 112, the logic device 120 is also in communication with the crossbar 112. The logic device 120 is also in communication with the I/O subsystem 108. The logic device 120 can be any kind of processor including, for example, a conventional processor, a field programmable gate array (FPGA) 132. The logic device 120 may also be referred to as the cell controller 120 through the specification. The logic device 120 includes a communications bus (not shown) that is used to route signals between the state machine 132, the CPUs 128, the memory buffers 124, the routing device 112 and the I/O subsystem 108. The cell controller 120 also performs logic operations such as mapping main memory requests into memory DIMM requests to access and return data and perform cache coherency functions for main memory requests so that the CPU and I/O caches are always consistent and never stale.

In one embodiment, the I/O subsystem 108 include a bus adapter 136 and a plurality of host bridges 140. The bus adapter 136 communicates with the host bridges 140 through a plurality of communication links 144. Each link 144 connects one host bridge 140 to the bus adapter 136. As an example, the bus adapter 136 can be a peripheral component interconnect (PCI) bus adapter. The I/O subsystem can include sixteen host bridges 140A, 140B, 140C, ..., 140P and sixteen communication links 144A, 144B, 144C, ..., 144P.

As shown, the cell 104 includes fours CPUs 128, however; each cell includes various numbers of processing units 128. In one embodiment, the CPUs are ITANIUM based CPUs, which are manufactured by Intel of Santa Clara, Calif. Alternatively, SUN UltraSparc processors, IBM power processors, Intel Pentium processors, or other processors could be used. The memory buffers 124 communicate with eight synchronous dynamic random access memory (SDRAM) dual in line memory modules (DIMMs) 144, although other types of memory can be used.

Although shown as a specific configuration, a cell 104 is not limited to such a configuration. For example, the I/O subsystem 108 can be in communication with routing device 112. Similarly, the DIMM modules 144 can be in communication with the routing device 112. The configuration of the components of FIG. 2 is not intended to be limited in any way by the description provided.

Figure 3:
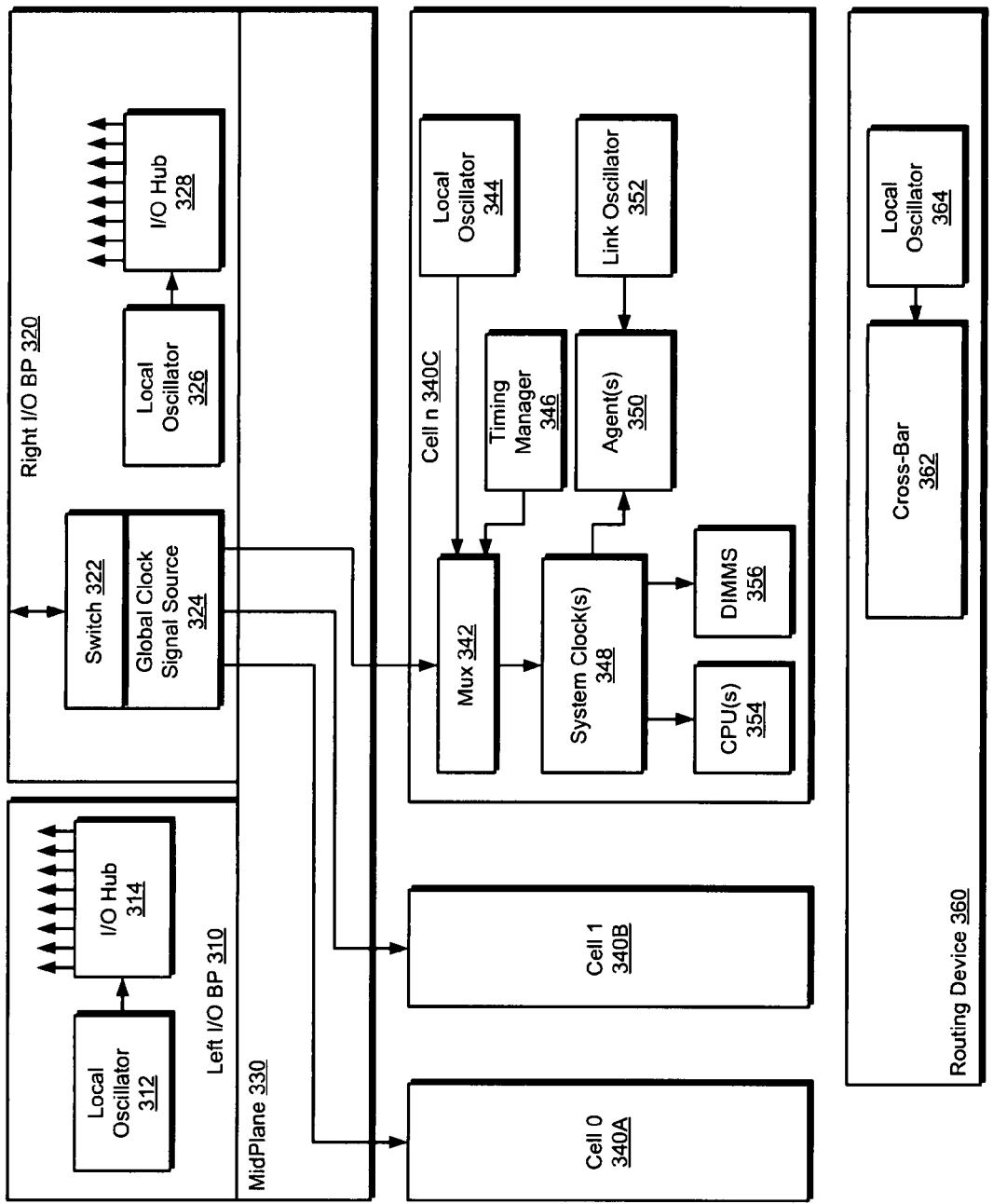
FIGS. 3-4 are schematic illustrations of a clock architecture in partitioned computer systems, according to embodiments.
Figure 5:
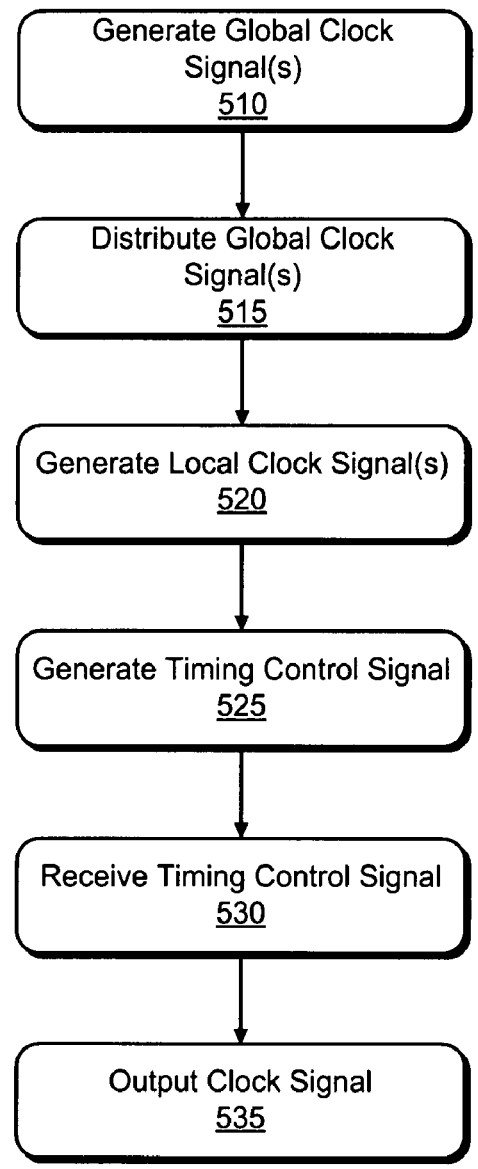
FIG. 5 is a flowchart illustrating operations in a method of operating a multiprocessor computer system according to some embodiments.

FIGS. 3 and 5 are schematic illustrations of clock architectures in partitioned computer systems, according to embodiments. In some embodiments, the clock architecture may be designed to eliminate, or at least to reduce, the likelihood that there shall be a multi-processor single point of failure (MP-SPOF) due to clock failure. Thus, in the embodiment depicted in FIG. 3, elements of the computer system incorporates a local clock source on an individual module basis with dedicated oscillators. Thus, a clock failure on individual module will affect only the partition to which the module belongs. Further, recovery of the failed partition upon reboot also becomes possible for certain partition configurations by deleting the failed module.

For example, in some embodiments the clock architecture provides reference clock signals to CEC ASICs (i.e., agents, I/O hubs, and crossbars), processors, PCI-Express devices, etc., that are in the system. Clock signals may be generated as a group within any standalone printed circuit board (PCB) assembly to meet the requirements for ASICs, processors and devices on that board.

Some operating systems may be incapable of supporting independent, local clock signals, and therefore may require a global reference clock signal to processors, communication (e.g., CSI) links and memory modules such as, e.g., dual in-line memory modules (DIMMS). Thus, the clock architecture may include one or more centrally generated and distributed clock signals.

Referring first to FIG. 3, in one embodiment, a clock architecture for a computer system 300 comprises a left input/output (I/O) backplane 310, a right I/O backplane 320, a midplane 330, a plurality of cells 340A, 340B, 340C (referred to generally by reference numeral 340), and a routing device 360.

Left input/output backplane 310 includes a local oscillator 312 which generates a clock signal, which is input to an I/O hub 314. Similarly, right I/O backplane 320 includes a local oscillator 326 which generates a clock signal, which is input to an I/O hub 328. Right I/O backplane 320 further includes a global clock signal source 324 and a switch 322. Clock signals from the global clock signal source 324 are distributed to cells 340 via midplane 330.

In the embodiment depicted in FIG. 3, the computer system 300 is depicted as including a number (n) cells. In practice, the number (n) may vary widely. The individual cells may have the same internal architecture, or may have varying internal architectures. Cell 340C includes a multiplexer 342, a local oscillator 344, a timing manager 346, at least one system clock 348, at least one agent 350, a link oscillator 352, and at least one CPU and DIMMS 356.

Inputs of multiplexer 342 are coupled to global clock signal source 324 and local oscillator 344. In addition, the control signal input of multiplexer 342 is coupled to timing manager. The output of mulitiplexer 342 is coupled to system clock(s) 348, the outputs of which are coupled to CPU(s) 354, DIMMS 356, and agent(s) 350. In some embodiments, agent(s) 350 provide an interface between processors in a cell, or between cells in a partition.

Computer system 300 further includes a routing device 360, which includes a cross-bar switch 362 and a local oscillator 364 to generate a local clock signal for cross-bar switch 362.

Figure 4:
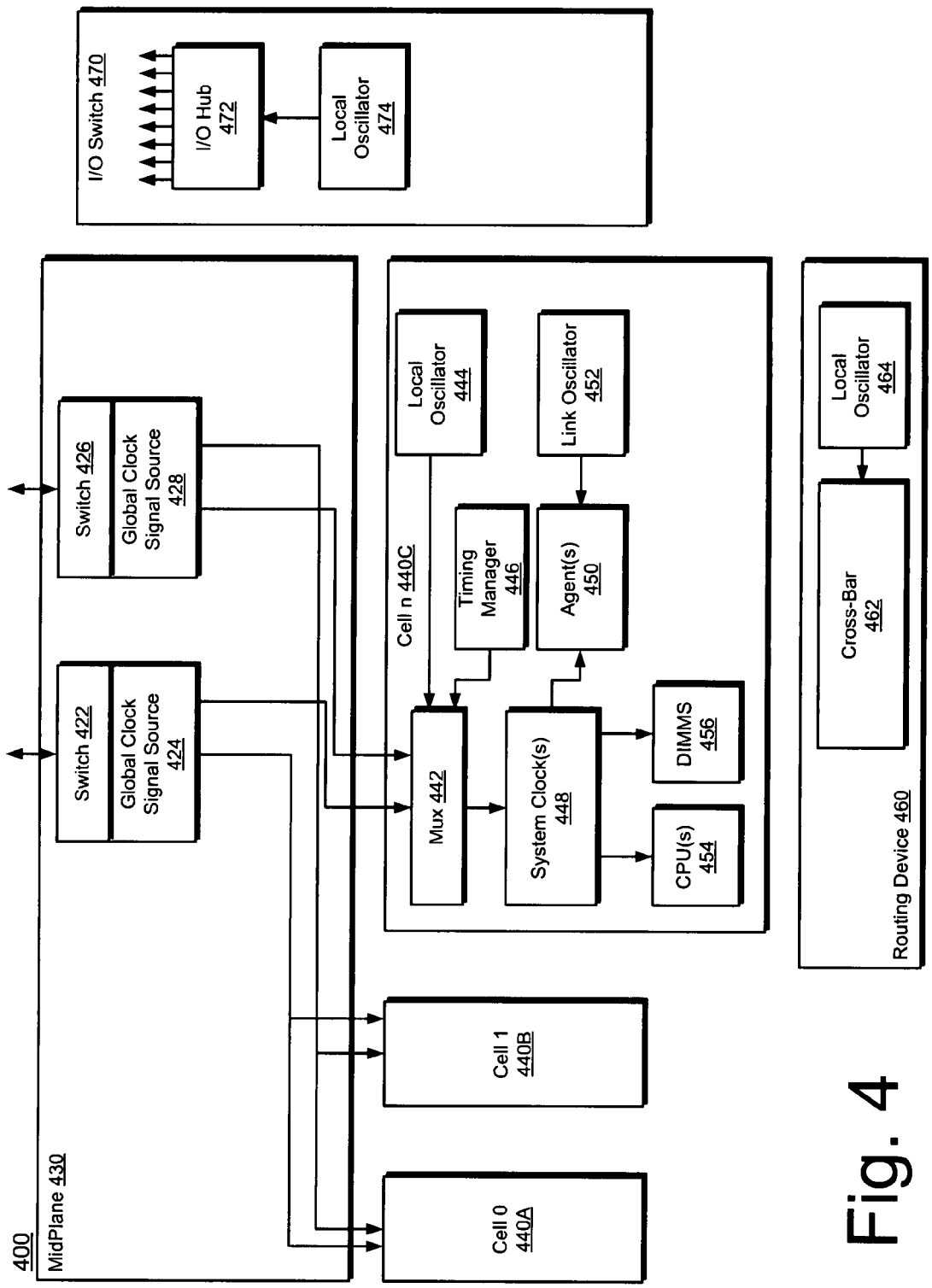

FIG. 4 is a schematic illustration of a clock architecture according to an embodiment. The architecture depicted in FIG. 4 is similar to the architecture of FIG. 3. Referring first to FIG. 4, in one embodiment, a clock architecture for a computer system 400 comprises a midplane 430, a plurality of cells 340A, 340B, 340C (referred to generally by reference numeral 440), a routing device 460, and an I/O switch. 470.

Midplane 430 carries signals from a first global clock signal source 424 and a first switch 422 coupled to the global clock signal source 424. Midplane 430 further comprises a second global clock signal source 428 and a second switch 426 coupled to the second global clock signal source 428. Clock signals from the global clock signal sources 424, 428 are distributed to cells 440 via midplane 430.

In the embodiment depicted in FIG. 4, the computer system 400 is depicted as including a number (n) cells. In practice, the number (n) may vary widely. The individual cells may have the same internal architecture, or may have varying internal architectures. Cell 440C includes a multiplexer 442, a local oscillator 444, a timing manager 446, at least one system clock 448, at least one agent 450, a link oscillator 452, and at least one CPU 454 and DIMMS 456.

Inputs of multiplexer 442 are coupled to global clock signal sources 424, 428 and local oscillator 444. In addition, the control signal input of multiplexer 342 is coupled to timing manager. The output of mulitiplexer 442 is coupled to system clock(s) 448, the outputs of which are coupled to CPU(s) 454, DIMMs 456, and agent(s) 450.

Computer system 400 includes a routing device 460, which includes a cross-bar switch 462 and a local oscillator 464 to generate a local clock signal for cross-bar switch 462. Computer system 400 further includes an I/O switch 470, which includes an I/O hub 472 and a local oscillator 474 to generate a local clock signal for the I/O hub 472.

In some embodiments, the timing managers 346, 446 may be embodied as logic which, among other things, generates a timing control signal which is input to multiplexers 342, 442, respectively. In some embodiments, the logic may be implemented as logic instructions stored in a computer-readable medium such as, e.g., a memory module, which may be executed on a processor. In other embodiments, the logic may be reduced to hardwired circuitry.

FIG. 5 is a flowchart illustrating operations in a method of operating a multiprocessor computer system according to some embodiments. Referring to FIG. 5, at operation 510 global clock signals are generated. For example, in the embodiments depicted in FIGS. 3 and 4, global clock signal may be generated by the global clock signal sources 324, 424, 428. At operation 515 the global clock signals are distributed to one or more cells in computer system. For example, in the embodiments depicted in FIGS. 3 and 4 the clock signals are distributed as input signals to the multiplexers 342, 442, respectively, via midplanes 330, 430, respectively.

At operation 520 local clock signals are generated. As noted above, in the embodiment depicted in FIG. 3, local oscillators generate independent clock signals for the I/O hubs 314, 328, the cross-bar 362, the agent(s) 350 and each cell 340. Similarly, in the embodiment depicted in FIG. 4, local oscillators generate independent clock signals for the I/O hubs 472, the cross-bar 462, the agent(s) 450 and each cell 440. The local clock signals generated by oscillators 344, 444 are input to the multiplexers 342, 442, respectively.

At operation 525 a timing control signal is generated. For example, in the embodiments depicted in FIGS. 3-4 the timing managers 346, 446, respectively, generate a timing control signal which is input to multiplexers 342, 442, respectively. In some embodiments, the timing signal may be based on factors such as, e.g., a characteristic of the operating system which executes on the respective computer cell 340, 440. For example, in the event that the operating system is capable of managing multiple, independent local clock sources the timing signal may be assigned a first value. By contrast, in the event that the operating system is incapable of managing multiple, independent local clock signals the timing signal may be assigned a second value. Other factors may be considered in setting the timing control signal.

At operation 530 the timing control signal is input to the respective multiplexers 342, 442, and at operation 535 the multiplexer outputs a clock signal in response to the timing control signal. For example, in the event that the timing control signal indicates that the operating system can manage multiple, independent local clock sources the multiplexers 342, 442, may output the clock signals from the local oscillators 344, 444, respectively. By contrast, in the event that the timing control signal indicates that the operating system can not manage multiple, independent local clock sources the multiplexers 342, 442, may output the clock signals from the global clock signal sources 324, 424, respectively.

The operations depicted in FIG. 5 enable a partitioned computer system such as the systems depicted in FIGS. 1-4 to operate using either a global clock source or a local clock source. Thus, the computer system may implement operating systems that support multiple, independent clock sources and operating systems that do not support multiple, independent clock sources.

Embodiments described herein may be implemented as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A computer system, comprising:
   at least a first computing cell and a second computing cell, each computing cell comprising at least one processor;
   a routing device to couple the first and second computing cells;
   a global clock signal source coupled to the first and second computing cells to generate a global clock signal;
   wherein each of the at least first computing cell and second computing cell comprise:
   at least one timing manager to generate a timing control signal, the timing control signal being based at least in part on an operating system executing in the respective computing cell;
   a local oscillator to generate a local clock signal;
   a multiplexer coupled to receive the global clock signal, the local clock signal, and the timing control signal, and to output one of the global clock signal or the local clock signal in response to the timing control signal.

2. The computer system of claim 1, further comprising a redundant global clock signal source to generate a redundant global clock signal.

3. The computer system of claim 1, wherein each computing cell further comprises an input/output module coupled to the at least one processor.

4. The computer system of claim 1, wherein the first computing cell executes a first operating system and the second computing cell executes a second operating system, different from the first operating system.

5. The computer system of claim 1, wherein the routing device comprises:
   a crossbar switch; and
   an oscillator to generate a local clock signal.

6. The computer system of claim 1, further comprising at least one serial communication link, wherein the serial communication link comprises an oscillator to generate a clock signal.

7. A method of operating a multiprocessor computer system comprising at least a first computing cell and a second computing cell and a routing device to couple the first computing cell to the second computing cell, comprising:
   generating at least one global clock signal;
   distributing the at least one global clock signal to at least one of the first computing cell or the second computing cell;

generating a local clock signal in at least one of the first computing cell or the second computing cell;

generating a timing control signal in the first computing cell and the second computing cell, the timing control signal being based at least in part on an operating system executing in the respective computing cell;

receiving the global clock signal, the local clock signal, and the timing control signal in a multiplexer in at least one of the first computing cell or the second computing cell; and selecting one of the global clock signal or the local clock signal to output from the multiplexer in response to the timing control signal.

8. The method of claim 7, further comprising generating a redundant global clock signal.

9. The method of claim 7, wherein distributing the at least one global clock signal to at least one of the first computing cell or the second computing cell comprises transmitting the global clock signal on a midplane bus.

10. The method of claim 7, further comprising executing a first operating system on the first computing cell and executing a second operating system on the second computing cell.

11. The method of claim 7, further comprising generating a local clock signal in the routing device.

12. A clock architecture for a multiprocessor computer system comprising at least a first computing cell and a second computing cell and a routing device to couple the first computing cell to the second computing cell, comprising:

a global clock signal source coupled to the at least two computing cells to generate a global clock signal;

at least one timing manager in each of the first computing cell and the second computing cell to generate a timing control signal, the timing control signal being based at least in part on an operating system executing in the respective computing cell;

a local oscillator in at least one of the first computing cell or the second computing cell to generate a local clock signal; and a multiplexer coupled to receive the global clock signal, the local clock signal, and the timing control signal, and to output one of the global clock signal or the local clock signal in response to the timing control signal.

13. The clock architecture of claim 12, further comprising a redundant global clock signal source to generate a redundant global clock signal.

14. The clock architecture of claim 12, wherein each computing cell further comprises an input/output module coupled to the at least one processor.

15. The clock architecture of claim 12, wherein the first computing cell executes a first operating system and the second computing cell executes a second operating system, different from the first operating system.

16. The clock architecture of claim 12, wherein the routing device comprises:
a crossbar switch; and
an oscillator to generate a local clock signal.

17. The clock architecture of claim 12, further comprising at least one serial communication link, wherein the serial communication link comprises an oscillator to generate a clock signal.

* * * * *